Oct. 9, 1934.  W. D. ARCHEA  1,976,107
MILLING MACHINE
Filed Dec. 31, 1931    4 Sheets-Sheet 1

Inventor
WALTER D. ARCHEA
By  H. K. Parsons
Attorney

Inventor
WALTER D. ARCHEA

Oct. 9, 1934.    W. D. ARCHEA    1,976,107
MILLING MACHINE
Filed Dec. 31, 1931    4 Sheets-Sheet 4

Inventor
WALTER D. ARCHEA
By HK Parsons
Attorney

Patented Oct. 9, 1934

1,976,107

UNITED STATES PATENT OFFICE 1,976,107

MILLING MACHINE

Walter D. Archea, Cincinnati, Ohio, assignor to The Cincinnati Milling Machine Company, Cincinnati, Ohio, a corporation of Ohio Application December 31, 1931, Serial No. 584,173

11 Claims. (Cl. 90—17)

This invention relates to milling machines and more particularly to improvements in universal attachments therefor.

One of the objects of this invention is to provide an improved milling machine for tool room work upon which a greater variety of work may be machined in one set-up than heretofore.

Another object of this invention is to provide a milling machine of the overarm type with an additional cutter spindle on the overarm which may be operated independently of the main spindle of the machine, making possible a selection of speed for each spindle most suitable for the operation to be performed by each.

A further object of this invention is to provide an improved universally adjustable spindle head for an overarm type of milling machine which may be angularly adjusted to a plurality of operative positions and which may also be moved to an inactive position, without removal from the machine to permit assembly or removal of arbor supports with respect to the overarm.

An additional object of this invention is to provide in an overarm for a milling machine having an angularly adjustable cutter spindle mounted thereon, a separate prime mover and variable speed transmission for the spindle whereby the same may be operated independently of the main spindle of the machine.

Other objects and advantages of the present invention should be readily apparent by reference to the following specification considered in conjunction with the accompanying drawings illustrative in one embodiment thereof but it will be understood that any modifications may be made in the specific structural details within the scope of the accompanying claims without departing from or exceeding the spirit of the invention.

Referring to the drawings, in which like reference numerals indicate like or similar parts:

Figures 1, 2:
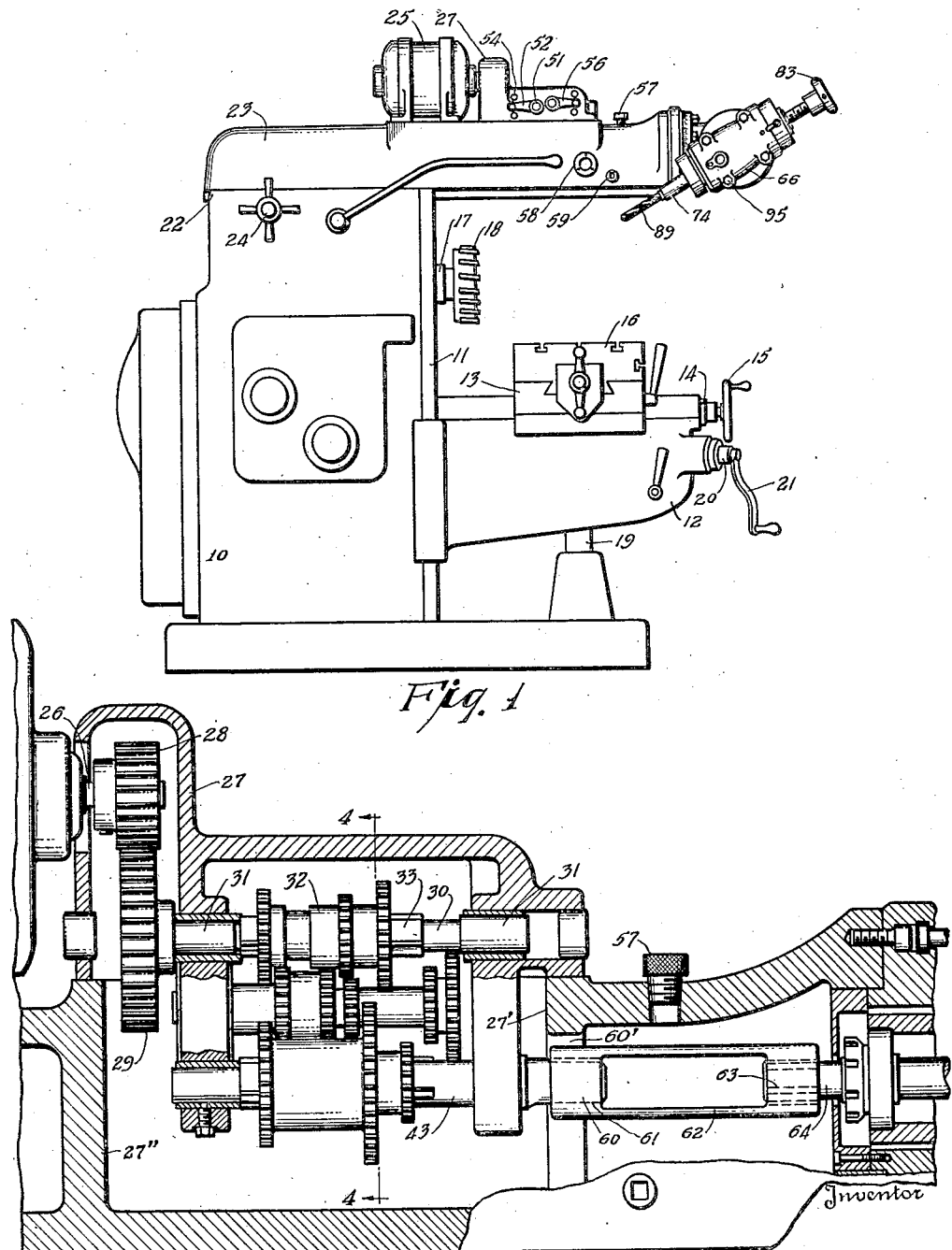
Figure 1 is a side elevation of a milling machine embodying the principles of this invention.
Figure 2 is a longitudinal section through the overarm showing the variable speed transmission for the adjustable spindle.

The invention has been shown in Figure 1 as embodied in a knee and column type milling machine in which the reference numeral 10 indicates the column of the machine having vertical guideways 11 formed upon one face thereof for receiving the vertically adjustable knee 12. Such machines have a saddle 13 adjustable on the knee toward and from the column which adjustment may be effected by a feed screw 14 journaled in the knee and provided with a hand wheel 15 on one end thereof; and also a table 16 slidably mounted on the saddle for movement transversely of a cutter spindle 17 journaled in the column for rotating a cutter 18 fixed therewith. The knee may be vertically adjusted by means of an elevating screw 19 journaled in the base of the machine and adapted to be rotated by a shaft 20 having a handle 21. The work is clamped to the table 16, and by means of the foregoing mechanism may be adjusted in three different planes with respect to the cutter spindle.

The top of the column 10 is provided with a guideway 22 for receiving an overarm 23 mounted therein and adapted to be longitudinally adjusted by means of the shaft 24 having a rack and gear connection therewith, not shown. The normal function of the overarm in such machines is to act as a support for the outboard end of a cutter arbor which has its other end fixed in the cutter spindle of the machine for power rotation thereby. This is effected by slidably attaching a pendant or arbor support to the underside of the overarm, the pendant having a suitable bore therein for journaling the arbor.

The cutters of such machines are susceptible of operating in only a horizontal and a vertical plane which requires that angular surfaces on work be positioned in one of these two planes in order to be finished. This requires resetting of the work after finishing the plane surfaces thereof. To obviate this difficulty, as well as many others, an additional cutter spindle has been mounted on the end of the overarm which may be angularly adjusted in two different planes for individual or simultaneous operation with respect to the main spindle, and which has its own prime mover and transmission so that it may be rotated at various speeds making possible independent selection of speed rates depending on size of cutter, material to be removed, etc., which greatly increases the facility of operation and the efficiency of the machine. The transmission for rotating this spindle is mounted on the overarm and will now be described.

Figure 3:
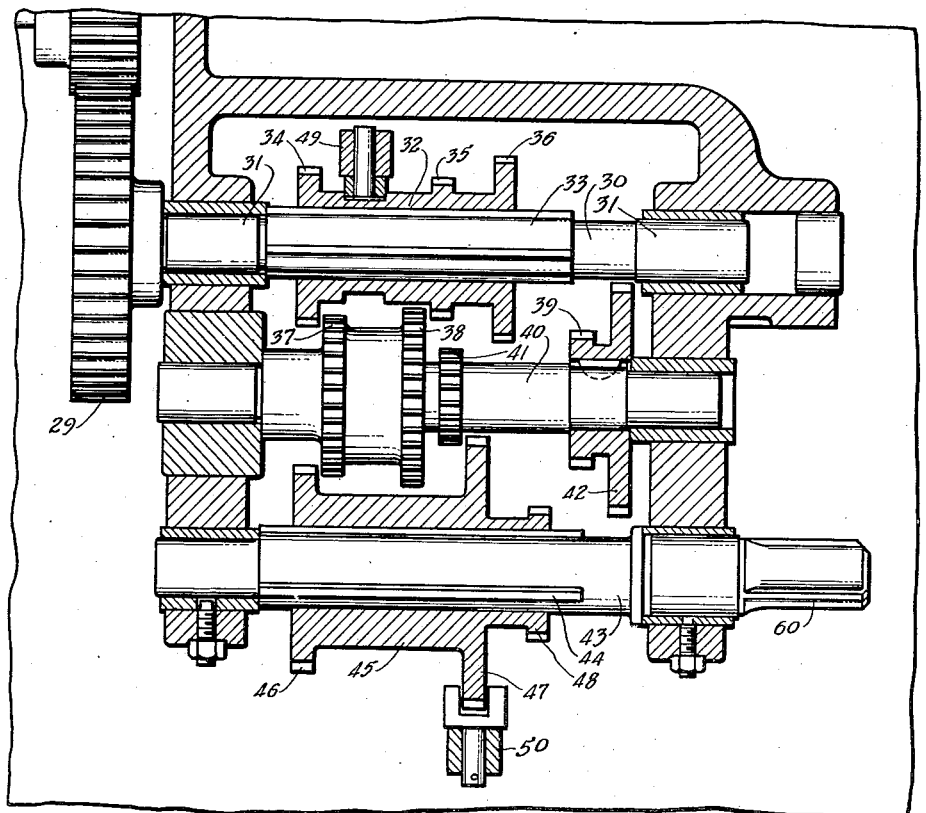
Figure 3 is an expanded view of the transmission shown in Figure 2.

As shown in Figures 1 and 2, a prime mover 25, which may be an electric motor, is mounted on the top of the overarm with its armature shaft 26 projecting into a transmission housing 27 having laterally extending end walls 27' and 27" formed in the overarm. A driving gear 28 is secured to the end of the shaft within the housing. This gear meshes with gear 29 secured to the end of the main drive shaft 30 which is journaled at opposite ends in bearings 31 in the housing. A gear cluster 32 is slidably mounted on the splined portion 33 of the shaft 30 for varying the speed of rotation of the spindle. As shown in Figure 3, this gear cluster comprises the gears 34, 35 and 36 shiftable into mesh respectively with gears 37, 38 and 39 fixed to the parallel shaft 40. Also fixed to this shaft are the gears 41 and 42. A final drive shaft 43 is journaled in the housing parallel to the shaft 40 and has a splined portion 44 upon which is slidably mounted the shiftable member 45 comprising gears 46, 47 and 48 which are shiftable into mesh respectively with gears 37, 41 and 42. From the foregoing it will be seen that the member 32 is shiftable to impart three different rates of rotation to the shaft 40, and that the member 45 is shiftable to three different positions thereby making possible nine different rates of rotation in the shaft 43.

Figure 4:
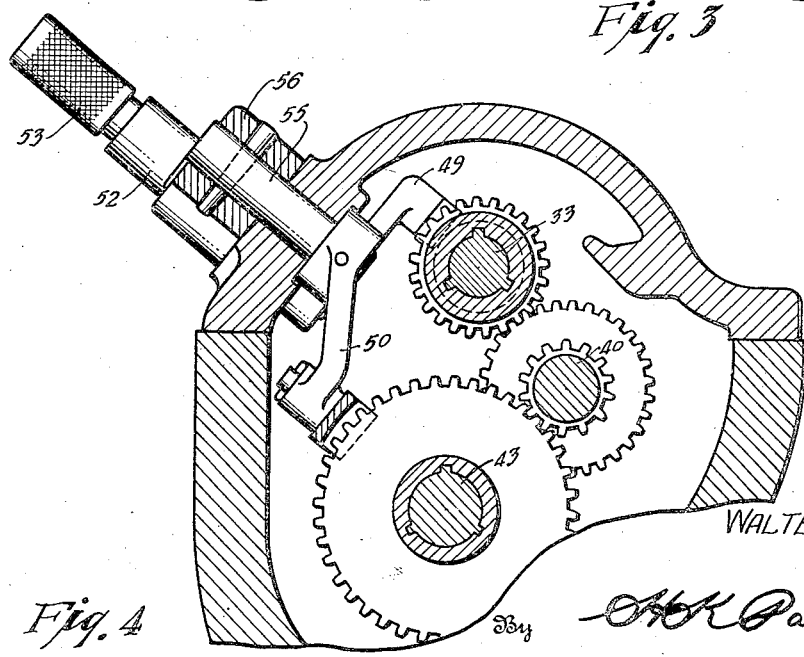
Figure 4 is a section on the line 4—4 of Figure 2.
Figure 5:
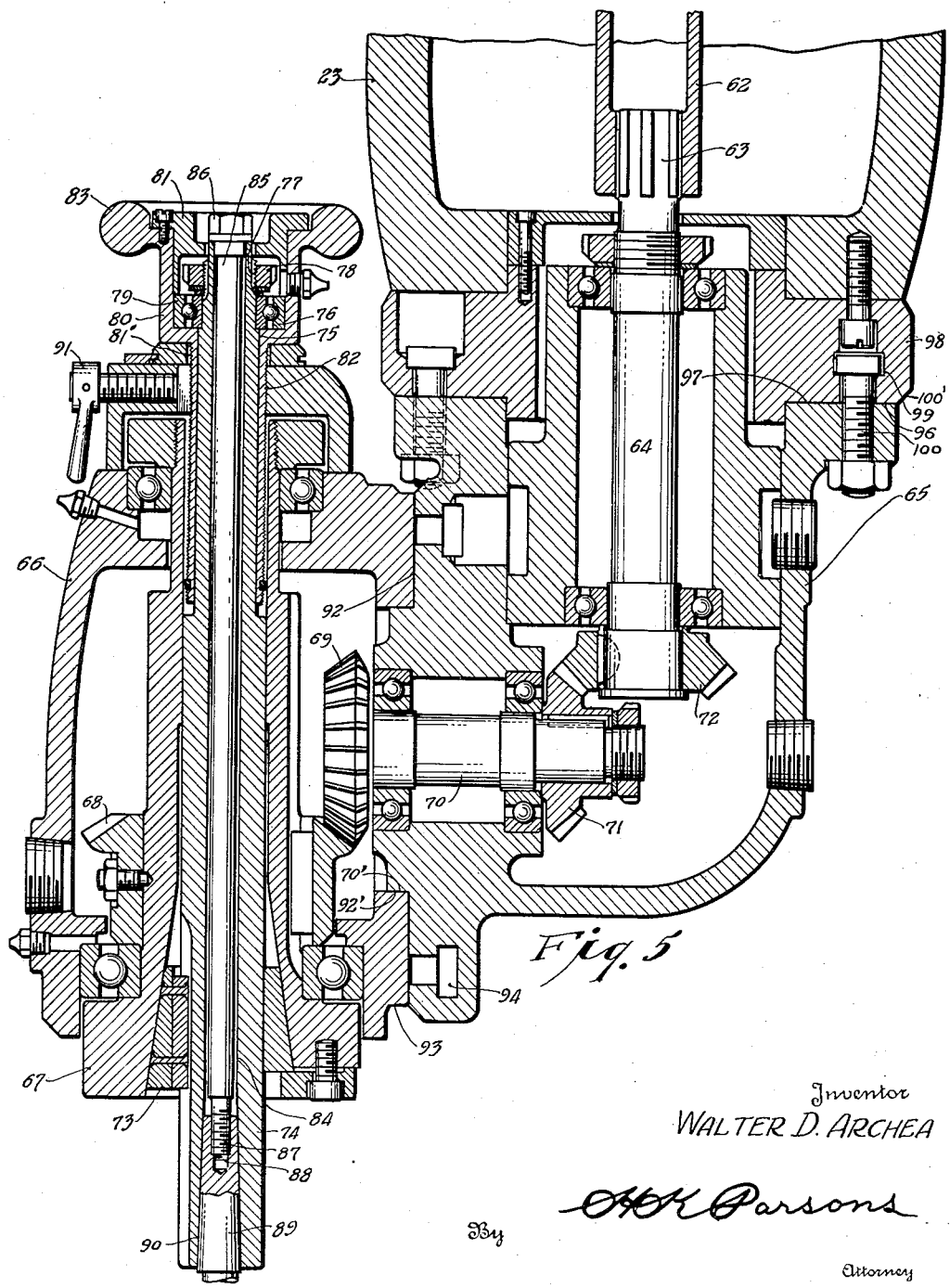
Figure 5 is a section through the universal head showing the cutter spindle and feeding mechanism therefor.

As shown in Figures 1 and 4 these rate changes are effected by the pivoted shifter fork 49 engaging the gear cluster 32 and the pivoted shifter fork 50 engaging the gear cluster 45. The shifter fork 49 is secured to the end of the stud shaft 51 having an operating handle 52 keyed to the outer end thereof including the plunger 53 slidable therein for engaging notches 54 formed in the exterior of the transmission housing for maintaining the handle and thereby the gear clusters in any one of three different power transmitting positions. The shifter fork 50 is similarly mounted on the end of a stud shaft 55 provided with an operating handle 56 which also may be moved to and locked in any one of three different positions by locating notches in a similar manner to that just explained. These notches may be numbered and a rate chart provided indicating the speed obtainable corresponding to the various combinations of positions of the control levers.

As shown in Figure 2, the transmission housing is completely inclosed thereby making it possible to utilize the lower part of the chamber for a lubricating oil sump. The oil level in this sump should be sufficiently high that the gears on the lower shaft 43 will be continuously engaging the oil thereby effecting lubrication of the other gears in the transmission, or a small pump may be provided for obtaining forced lubrication. A removable plug 57 may be provided to permit filling the sump with oil and a gauge glass 58 provided in the wall for indicating the preferred level of oil in the housing. An additional plug 59 is threaded in the lower part of the reservoir for draining the oil therefrom for cleaning purposes.

As shown in Figures 2 and 3, the end of the shaft 43 is provided with a splined portion 60 passing through aperture 60' in wall 27 and engaging the splined bore 61 of a connecting sleeve 62 which also engages the splined end 63 of shaft 64. The sleeve 62 acts as a detachable coupling by means of which the transmission may be coupled to the universal head. The shaft 64 is journaled in the universal head, and since the splined end of the shaft simply slides into the splined bore of the sleeve, it will be seen that the driving connection can be automatically made upon assembly of the head to the overarm.

It may be necessary to vary the length of overarm according to the size of machine it is used with, in which case, this variation is effected by changing the length of the intervening portion between the end wall 27' of the housing and the end of overarm which enables all of the parts to be made the same for various sizes of overarms, with the exception of the sleeve 62 which is varied in length in accordance with the variance in length of said intervening portion.

The shaft 64 is anti-frictionally journaled in the elbow member 65 which is rotatable through an angle of 360 degrees about the axis of the shaft 64. A spindle head 66 is attached to the elbow 65 for rotation through an angle of 360 degrees in a plane at right angles to the plane of movement of the elbow member. A cutter spindle quill 67 is anti-frictionally journaled in the head 66 and driven from shaft 64 by means of a bevel gear 68 meshing with the bevel gear 69 keyed to the end of stud shaft 70 journaled in the member 65. The shaft 70 carries a bevel gear 71 on its other end meshing with the bevel gear 72 which is keyed to the shaft 64.

The quill 67 is provided with a splined bore 73 in which is slidably mounted the cutter spindle 74. This spindle is provided on one end with a shoulder 75 engaging one side of the thrust bearing 76 and is threaded at 77 to receive the clamping nut 78 engaging the other side of the thrust bearing by means of which the spindle is fixed with the bearing. The exterior race 79 of the bearing is secured in the hollow sleeve 80 by means of the clamping ring 81. The sleeve 80 is provided at one end with a reduced threaded portion 81' engaging the threaded bore 82 formed in the casting and on its other end with an operating hand wheel 83 by means of which the sleeve may be rotated and thus moved axially to effect feeding of the cutter spindle.

The cutter spindle is provided with a longitudinal bore 84 in which is slidably mounted a draw bolt 85 having a hexagonal head 86 at one end and a threaded portion 87 at the other end for engaging the threaded socket 88 of a tool 89 mounted in the tapered socket 90 formed in the end of the cutter spindle. From this it will be seen that suitable tools may be mounted and fastened in the end of the cutter spindle for power rotation and for manual feed. A locking screw 91 is threaded in the side of the housing 66 for engaging the threaded portion 82 of the sleeve 80 to lock the same in any desired axially adjusted position.

The spindle head 66 is provided with an annular surface 92 having a bore 92' engaging the projecting boss 70' which is formed concentrically about the axis of the shaft 70 whereby the head may be rotatably adjusted thereabout while still maintaining the driving connection between the bevel gears 69 and 68. To facilitate positioning of the head the exterior annular surface 93 is provided with graduations in degrees and fractional parts thereof, cooperating with a fixed mark on the member 65 whereby the operator may read directly the angle of the cutter spindle with respect to a reference line. A T slot 94 is formed in the member 65 for receiving T headed bolts 95 by means of which the member 66 is clamped in position after angular adjustment.

The member 65 is provided with a surface 96 abutting the annular surface 97 formed on the adapter plate 98, the surface 96 having a bore 96' fitting the projection 97' by which the parts are held concentric to the axis of the shaft 64. The plate 98 is provided with a T slot 99 for receiving clamping bolts 100 by means of which the head 65 may be clamped in an angular adjusted position. Also the member 65 is provided with the exterior angular surface 100' upon which graduations may be marked for cooperation with a fixed mark on the member 98 to facilitate in determining its angular adjustment. The adapter plate is fixed to the end wall of the overarm concentric with the axis of shaft 43.

Figure 6:
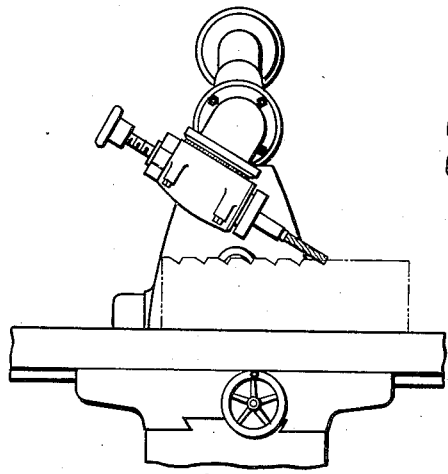
Figure 6 is a partial end view of the machine showing one method of utilizing the fixture.

From the foregoing it should now be apparent that the cutter spindle 74 may be angularly adjusted in a vertical plane about the axis of the shaft 64 and also angularly adjusted in a horizontal plane about the axis of the shaft 70 each of these adjustments being possible through a full circle of 360 degrees. As shown in Figure 1, the spindle 74 may be positioned at any angle and provided with suitable tools for drilling, reaming or spot facing an angular surface of the work, after which the lateral surface of the work may be milled by the cutter 18. Another method of utilizing the device is shown in Figure 6 in which the spindle is adjusted at an angle to a vertical plane and the saddle traversed to effect V shaped grooves in the surface of the work.

Figure 7:
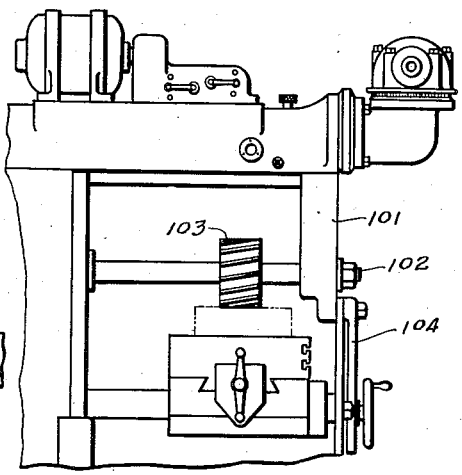
Figure 7 is a partial side elevation showing the fixture in an operative position to permit normal operation of the machine.

The device is so constructed that it may be rotated about the axis of the shaft 64 to a vertical inactive position as shown in Figure 7, to clear the guideways formed on the bottom of the overarm so that a pendant or arbor support 101 may be slidably mounted thereon in the usual manner for journaling the outboard end of a cutter arbor 102 carrying a cutter 103 in the normal manner of operation of such machines, and the usual braces 104 may be attached to the pendant for bracing the parts in position. After utilization of the machine in this manner, these parts may be quickly removed without disturbing the work piece and the universal head swung down for milling, boring, reaming, drilling or spot facing other surfaces of the work.

Figure 8:
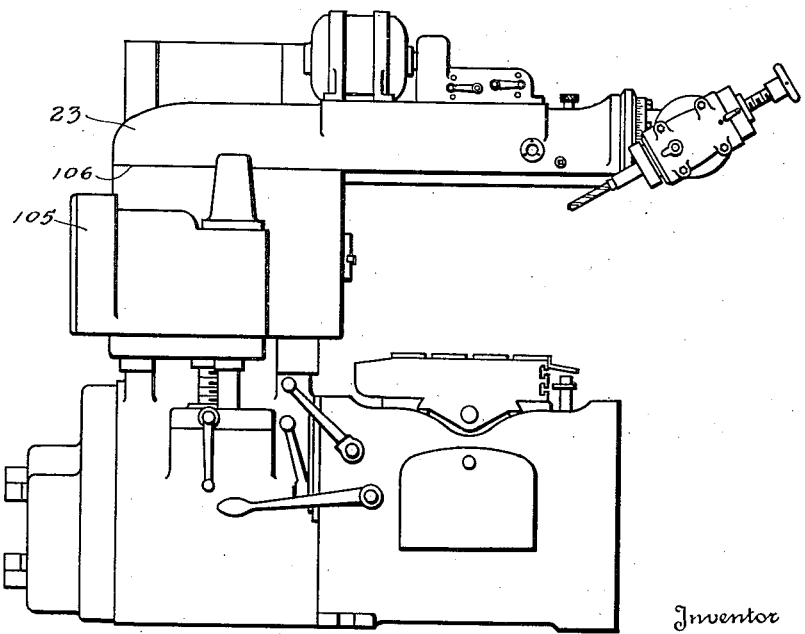
Figure 8 is a modified form of the invention as applied to a bed type milling machine.

Although the invention has been illustrated as applied to a knee and column type machine it is also susceptible of application to other types of machines, and as shown in Figure 8 it may be applied to a bed type milling machine in which the spindle carrier 105 has a guideway 106 formed in the upper surface thereof for receiving the overarm 23. Its method of use and operation thereof would be the same as in the knee and column type machine.

From the foregoing description it should now be apparent that an attachment for a milling machine has been provided which increases the adaptability of the machine for a greater variety of work than heretofore, making it possible to mill odd shaped work pieces in one set-up of the work piece as well as drill, ream and spot face angular holes therein; and in which the fixtures may be readily moved to an inactive position so that the machine may be set up with a cutter arbor, pendant and braces in the usual manner of such machines.

That which is claimed is:

1. A milling machine having a column, a work support, an overarm adjustably mounted on the column for movement transversely of the work support, a universal attachment secured to the end of the overarm, a cutter spindle journaled in said attachment, means to longitudinally adjust the overarm to change the position of the cutter spindle relative to the work support, additional means for varying the angularity of the cutter spindle in two different planes, means to indicate the angularity of the spindle in each plane, means to feed the cutter spindle axially toward and from the work support, and power means for rotating the spindle in all positions of adjustment thereof including a prime mover mounted on the overarm, and a variable speed transmission housed in the overarm for coupling the prime mover to the spindle for actuation thereby.

2. A milling machine having a column, a work support mounted on the column, a cutter spindle journaled in the column, means to vary the relationship between the cutter spindle and the work support, an overarm mounted on the top of the column, means carried by the overarm for supporting the free end of said cutter spindle, a universal attachment secured to the end of the overarm, a cutter spindle in an arbor mounted in said attachment, means carried by the overarm for actuating said last named cutter spindle independent of the first-named spindle including a drive shaft journaled in the overarm in parallel relationship to the first named cutter spindle, motion transmitting means coupling one end of said drive shaft to the spindle, a prime mover mounted on the overarm, and a variable speed transmission coupling the prime mover to the drive shaft for actuation thereof at different rates of rotation.

3. An overarm structure for a milling machine comprising an elongated housing, longitudinal guides formed on one side of said housing for engagement with the guideway of a machine tool, a shiftable gear variable speed transmission mounted in said housing, a prime mover mounted on the exterior of said housing, means coupling the prime mover to the transmission, gear shifter control levers pivotally mounted on the exterior of said housing for varying the speed of said transmission, said transmission terminating in a final drive shaft, the end of said overarm having an attachment receiving surface formed at right angles to said guides, said surface having a locating bore formed co-axial to said shaft, a universal attachment adapted to be secured to the end of the overarm having a projecting lug engageable with the bore, said attachment having a spindle drive shaft journaled therein co-axial of said lug, and means whereby the spindle drive shaft will be automatically coupled to the overarm drive shaft upon assembly of the attachment to the end of the overarm.

4. An overarm structure for a machine tool comprising an elongated housing having guides formed upon one face for attaching purposes, a transmission housing formed in the overarm, a variable speed transmission mounted in said housing, a prime mover mounted on the exterior of said overarm, means coupling the prime mover to the transmission, change speed mechanism including control levers associated with said transmission for varying the rate thereof, said transmission terminating in a final drive shaft, a laterally extending wall in the overarm forming one end of the transmission housing, said wall having an aperture therein through which said final drive shaft extends, an attachment receiving surface formed on the end of the overarm in spaced relation to the end wall of the transmission housing, the spacing therebetween being of various lengths, a universal attachment having a spindle drive shaft therein attached to the end of the overarm, said spindle drive shaft having a splined projecting portion, and a connecting drive sleeve having a splined bore in each end for coupling the end of the transmission drive shaft with the end of said spindle drive shaft, said sleeve varying in length in accordance with the spacing between the transmission housing wall and the attachment receiving surface on the end of the overarm.

5. A milling machine having a column, vertical guideways formed on one face of the column, a knee slidably mounted on said guideways, a saddle adjustably mounted on the knee, a table reciprocably mounted on the saddle, a cutter spindle journaled in the column, an overarm mounted on the top of the column, said overarm having longitudinal guideways permitting relative axial adjustment thereof, said guideways extending the full length of said overarm, a pendant adapted to be slidably mounted on the overarm guideway for supporting the outboard end of said cutter arbor whereby the cutter may be mounted for rotation in co-operative relation to the work support for finishing surfaces on the work lying in one plane, a universal spindle attachment mounted on the end of the overarm, a prime mover carried by the overarm for movement therewith, a transmission mounted in the overarm for coupling the prime mover to the spindle, and means to adjust said spindle axially in co-operative relation to the work support to finish a surface on the work piece lying in a second plane.

6. A milling machine having a support, a spindle carrier mounted on said support, a cutter spindle journaled in the carrier for rotating a cutter arbor adapted to be supported at one end by the spindle, an overarm mounted on the carrier having means thereon for supporting the outboard end of said arbor, an angularly adjustable attachment secured to the end of the overarm having a cutter spindle journaled therein, means self-contained in the overarm for rotating said last named cutter spindle while the first named cutter spindle is stationary including a prime mover mounted on the overarm, a variable speed transmission inclosed in the overarm, a power train operatively connecting the prime mover to said transmission, and an additional train coupling the transmission to the cutter spindle in the attachment for actuating the same in all positions of adjustment thereof.

7. A milling machine having a support, a spindle carrier mounted on the support having a cutter spindle journaled therein, a work table carried by the support for movement transversely of said spindle, said carrier having guideways formed on the upper surface thereof, an overarm mounted in said guideways for movement parallel to said spindle, a universal spindle attachment mounted on the end of the overarm in operative relation to the work table, an auxiliary cutter spindle journaled in said attachment, means to vary the angular relation of the cutter spindle with respect to the work support, power means self-contained in the overarm for effecting rotation of the auxiliary spindle in all positions of adjustment thereof including a prime mover mounted on the top of the overarm for longitudinal movement therewith, a transmission housing formed within the overarm, a shiftable variable speed transmission mounted in said housing, means coupling the prime mover with the transmission for actuation thereby, a motion transmitting train coupling the variable speed transmission with the auxiliary cutter spindle whereby the same may be rotated in all angularly adjustable positions thereof and while the main spindle is stationary, shiftable members operatively coupled to the change gears for varying the speed of the transmission, and control levers mounted on the exterior of said housing for actuating said shifting members.

8. A milling machine having a vertical support, a power rotatable cutter spindle journaled in said support, guide surfaces formed on the support and extending parallel to the axis of said spindle, an overarm having complementary guide surfaces extending the full length thereof interengaging the guide surfaces of said support, said overarm having one end projecting beyond the support whereby the guide surfaces on the overarm may be utilized for supporting a pendant, a second cutter spindle journaled in the end of the overarm, and means carried by the overarm for rotating the last-named spindle while the first-named spindle is at rest, including a prime mover mounted on the overarm and a variable speed transmission self-contained in the overarm for coupling the prime mover for rotation of the last-named spindle at a plurality of rates.

9. A milling machine having a column, a horizontal guide way formed on the upper face of the column, a cutter spindle journaled in the column with its axis parallel to said guide way, a cutter arbor rotatably supported at one end in the spindle for power rotation thereby, an overarm having complementary guide surfaces extending the full length thereof interengaging the guide way in the column for longitudinal adjustment relative thereto, means detachably mountable on the extending portion of the overarm guide way for supporting the outboard end of the cutter arbor, an angularly adjustable attachment secured to the end of the overarm, said attachment including a cutter spindle journaled therein, means to vary the angular relationship between the two cutter spindles and means for rotating the last named cutter spindle independently of the first-named cutter spindle including a prime mover mounted on top of the overarm and a variable speed transmission contained within the overarm coupling the prime mover to the adjustable spindle, said last-named parts being movable as a unit with the overarm during adjustment thereof.

10. A milling machine having a column, a work support adjustably mounted on the column including a knee, saddle and table, said table having a horizontal work receiving surface thereon, a first cutter spindle journaled in the column parallel to the plane of said work surface, a guide way formed in the column parallel to the axis of said spindle, an overarm mounted in said guide way for axial adjustment relative thereto, said overarm projecting from the column and overlying said work receiving surface of the table, a second cutter spindle journaled in the end of the overarm, means to adjust said spindle through complete circles in two different planes normal to one another, each of said planes intersecting the work receiving surface at right angles thereto, additional means for axially feeding the last-named spindle in any adjusted position thereof, and means for effecting rotation of the last-named spindle independently of the first-named spindle including a prime mover mounted on the overarm, a variable speed gear box contained within the overarm, motion transmitting connections coupling the prime mover to the gear box and additional motion transmitting connections coupling the gear box to said last-named spindle for actuation thereby.

11. In a machine tool structure the combination of a spindle housing, a support therefor, a variable speed gear box mounted in the support, a prime mover, motion transmitting means coupling the prime mover to the gear box, said support having a wall therein forming one side of the gear box, said gear box including a driver projecting through said wall and terminating adjacent thereto, a boss for supporting the spindle housing in spaced relation to said wall, said spacing being variable in accordance with the size of the structure and a motion transmitting connector variable in length in accordance with variation in said spacing for coupling the driver to the spindle for actuation thereby.

WALTER D. ARCHEA.